(No Model.)
H. F. BOND.
HAY TEDDER.
No. 598,623. Patented Feb. 8, 1898.
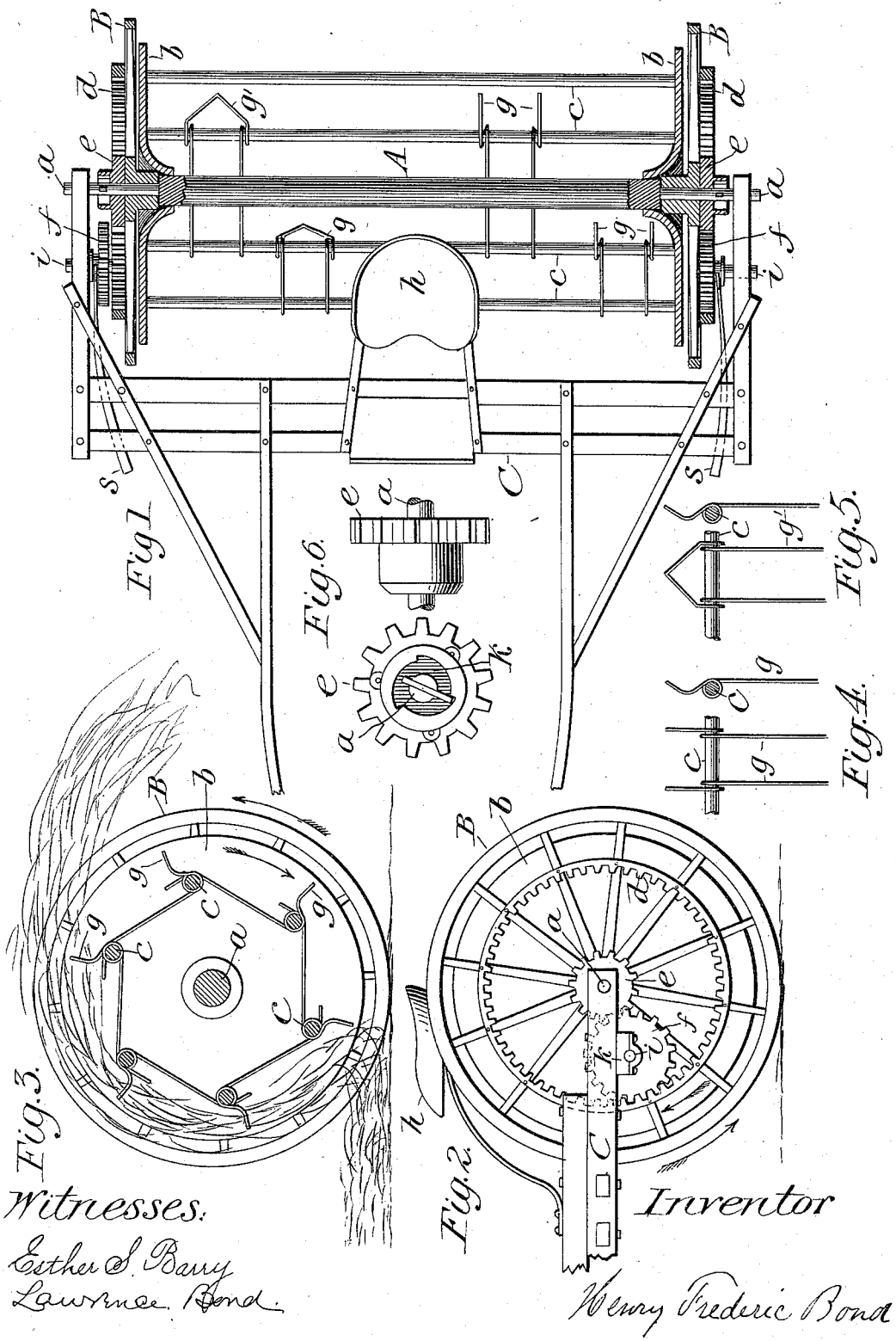
Witnesses:
Esther S. Barry
Lawrence Bond
Inventor
Henry Frederic Bond
THE NORRIS PETERS CO., PHOTO-LITHO., WASHINGTON, D. C.

UNITED STATES PATENT OFFICE.

HENRY FREDERIC BOND, OF NEWTON, MASSACHUSETTS.

HAY-TEDDER.

SPECIFICATION forming part of Letters Patent No. 598,623, dated February 8, 1898.

Application filed November 7, 1895. Serial No. 568,285. (No model.)

*To all whom it may concern:*

Be it known that I, HENRY FREDERIC BOND, residing at West Newton, in the county of Middlesex and State of Massachusetts, have invented an Improvement in Hay-Tedders, of which the following is a specification.

My invention relates to improvements in hay-tedding machines by which forks are made to scatter the grass or hay by horse-power.

My object is to do the work more effectually than heretofore by throwing the grass higher into the air and leaving it on the ground the other side up. This object is attained by the mechanism illustrated in the following drawings accompanying this specification.

Figure 1 is a view of the tedder from above. Fig. 2 represents one end of the machine with its cog-wheels and the manner in which the grass or hay is taken up, turned over, and centrifugally scattered. Fig. 3 shows an end view of the reel with one disk detached, its relative position, and the manner of attaching the forks. Fig. 4 shows a good form of the forks, front and side views. Fig. 5 is another form of fork or hay-lifter with front and side views. Fig. 6 shows detail views of the ratchets for connecting pinion $e$ with the axle $a$.

A is the reel, which carries the forks $g\ g$. $a$ is its axle, to which it is firmly attached, and also it is the axle of the carriage; $b\ b$, the disks at each end; $c\ c$, the rods which connect the disks; B B, wheels; $d\ d$, internal cog-wheels bolted to B B.

$e\ e$ are loose cog-wheels, which by internal ratchets like those commonly in use in lawn-mowers or by some other device are made to operate upon the reel during forward movement only.

$f\ f$ are connecting cog-wheels made to ship and unship on their arbors $i\ i$ and are represented in Fig. 1, one as shipped and the other as unshipped.

$s\ s$ are the shippers.

The forks $g\ g$, Figs. 1, 3, 4, and 5, attached to rods $c\ c$, may also be hooked, each to the next rod. It will be observed that, sliding, they may be placed on the six rods of the reel either in rows or alternately or spirally in such relation to each other as may be found desirable for different growths or kinds of grass. These forks or lifters are made of spring-wire and may have open tines, as in Fig. 4, $g$, or tines closed into one, as in Fig. 5, $g'$. The form in Fig. 5, $g'$, is best adapted for working in grasses that are inclined to cling and clog—such as clover, millet, and extra-rank timothy. Each is coiled around one of the rods of the reel $c\ c$ loosely and loosely hooked to the next rod $c$, so as to allow the straight portion of $g\ g'$ and the coil to spring freely. The tines are bent backward, so that they may more directly spring clear of stones, hummocks, or other obstructions. The extension of the forks $g\ g'$ from one rod of the reel to the next prevents the hay or grass from falling into the midst of the reel. The disks $b\ b$, forming the ends of the reel and larger than the circle described by the forks, guard the wheels from the hay. Fig. 5 shows another form of fork, front and side. In this device one shaft $a$ is made to serve as an axle for the wheels and as the arbor which supports the reel and its forks. It is manifest that the gearing is such that the revolution of the reel is the reverse of that of the wheels and that it may be made so as to revolve faster than the wheels, so that the grass being caught up by the forks under the axle or shaft will be carried up over the reel and dropped or thrown centrifugally behind it and at the same time scattered or turned over.

I am aware that revolving tedders have been invented and that the rotation has sometimes been the reverse of the carriage-wheels, and I therefore do not make a broad claim for such a device.

What I claim as my invention is—

1. The reel A with its forks and its disks attached firmly to the axle or shaft $a$ and consequently turning with the axle, and occupying only and exclusively the space directly between the driving-wheels.

2. The reel A with its forks and its disks which are attached firmly to the axle $a$ in combination with the loose driving-wheels B B and the system of cog-wheels outside of the driving-wheels B B and the pawls and ratchets within the pinions $e\ e$, substantially as specified.

3. The hay lifter or fork formed like two separated tines bent to meet at their points and there welded together.

HENRY FREDERIC BOND.

Witnesses:
LAWRENCE BOND,
R. HARLOW BACK.